April 11, 1967 J. W. ROSS ETAL 3,313,359
MACHINE FOR THERMALLY WORKING MINERALS
Filed April 23, 1964 5 Sheets-Sheet 5

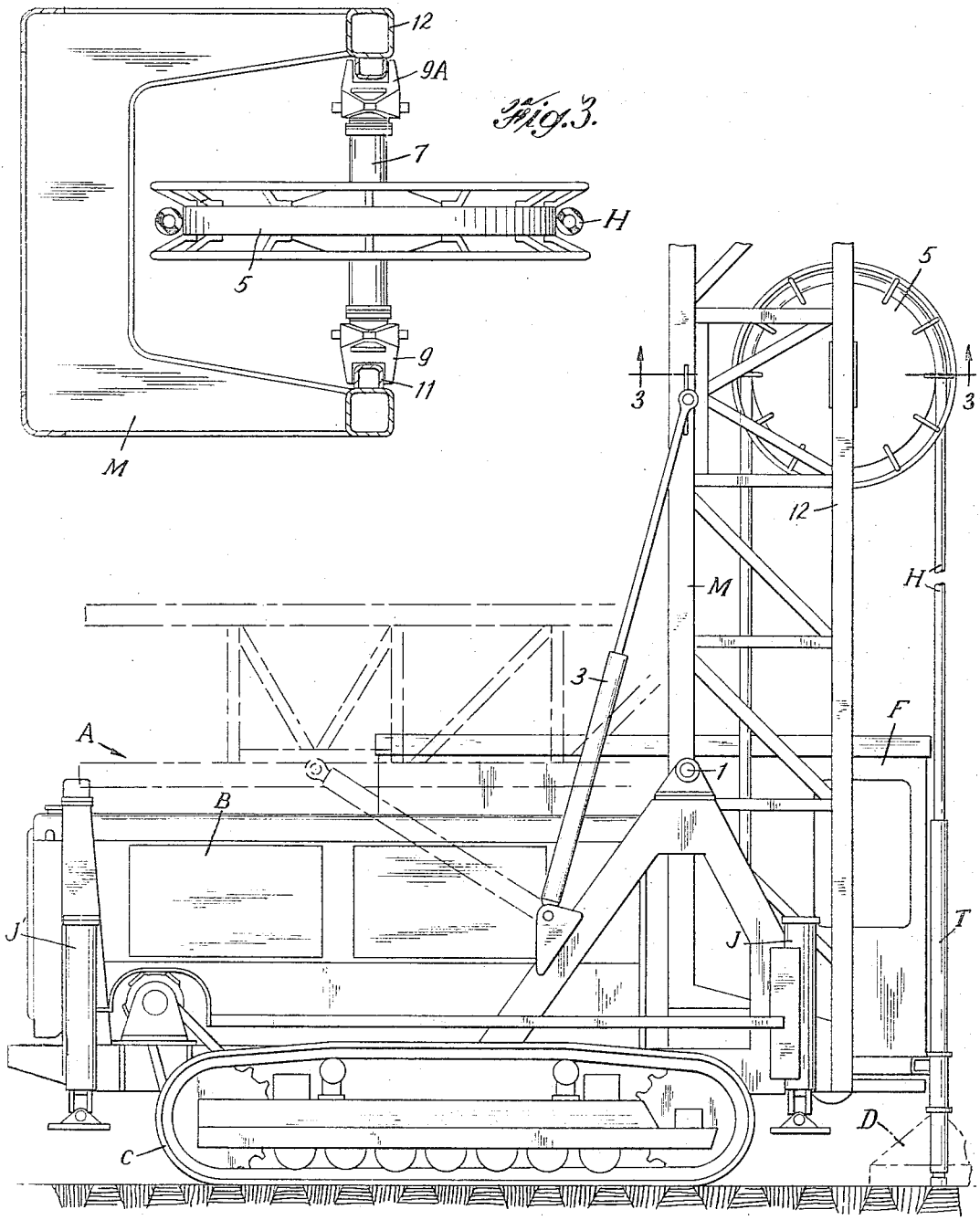

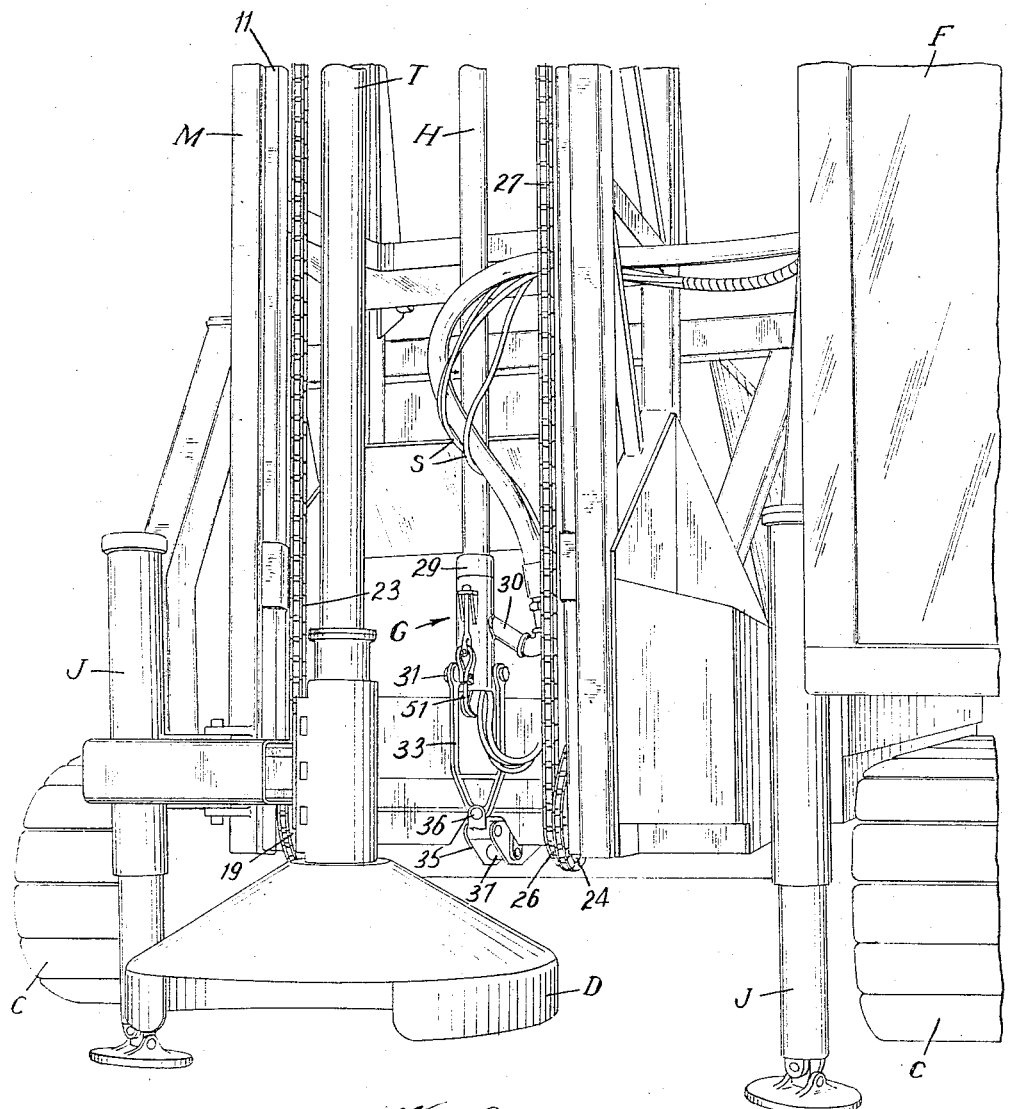

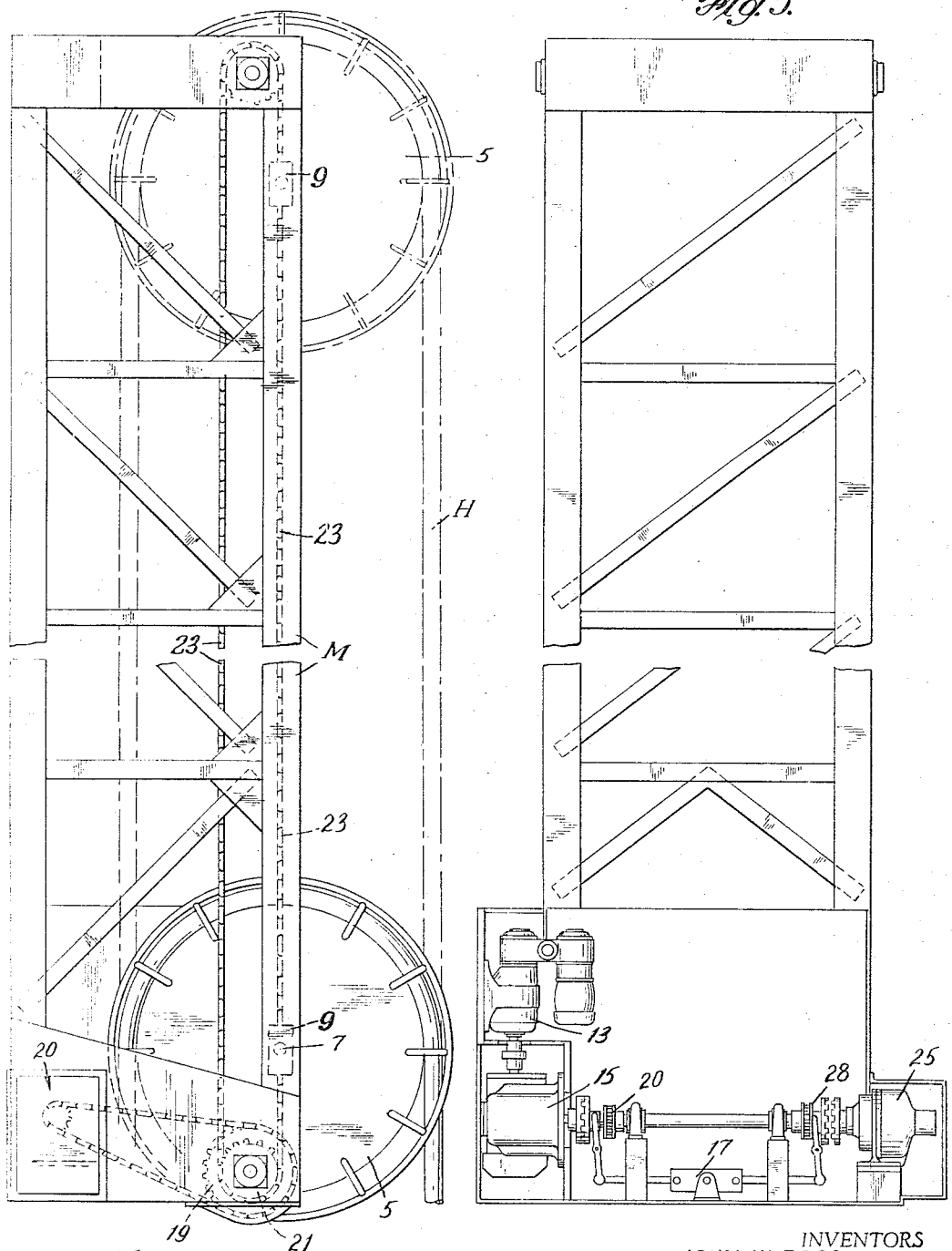

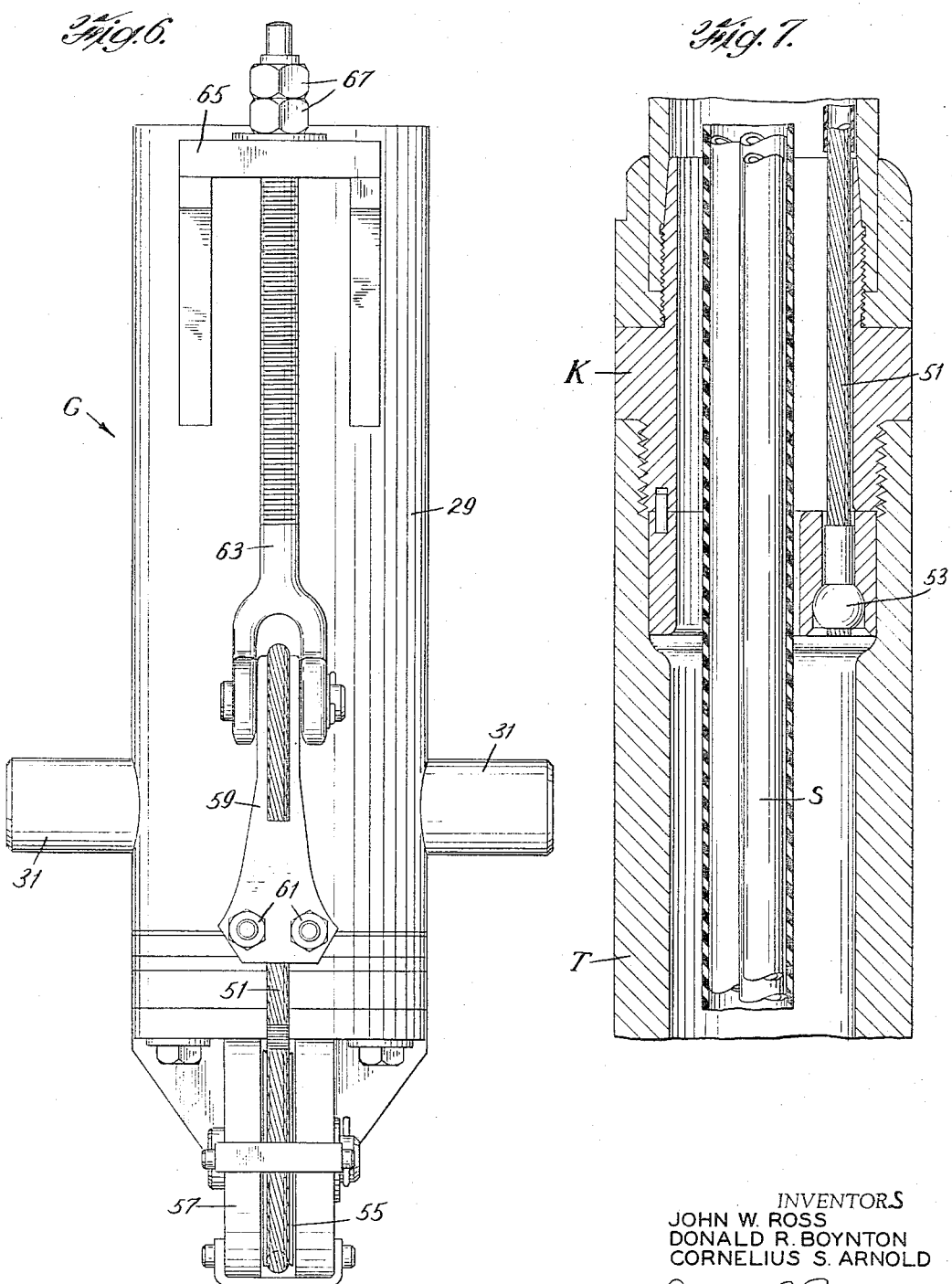

INVENTORS
JOHN W. ROSS
DONALD R. BOYNTON
CORNELIUS S. ARNOLD

ATTORNEY 3,313,359
MACHINE FOR THERMALLY WORKING
MINERALS
John W. Ross, Toronto, Ontario, and Donald R. Boynton, Don Mills, Ontario, Canada, and Cornelius S. Arnold, Cranford, N.J., assignors to Union Carbide Canada Limited, Toronto, Ontario, Canada, a corporation of Canada
Filed Apr. 23, 1964, Ser. No. 361,969
5 Claims. (Cl. 175—11)

This invention relates to a machine for thermally working minerals and more particularly to a highly maneuverable, compact rock-working machine.

Rock-working machines of the type contemplated by the present invention are commonly referred to as jet piercing machines. Such machines basically include a cab riding on tractor crawlers and a high mast which carries an oxy-fuel blowpipe and necessary auxiliary equipment. The oxy-fuel blowpipe produces a jet flame which removes the rock being treated by a spalling action. The blowpipe is commonly referred to as a jet piercing blowpipe. Accordingly, the process has become known as the "jet piercing" process and the machines have become known as jet piercing machines.

Thermal or jet piercing has been successfully practiced for a number of years with several types of jet piercing machines. In one type of machine, the length of the blowpipe had to be greater than the full depth of the hole to be pierced or chambered. Thus, if a fifty foot hole was to be pierced, the blowpipe would have to be at least fifty feet long. Accordingly, the mast on the jet piercing machine handling such blowpipe had to be of comparable height. Such masts were not only expensive to construct but maneuverability of the machines with these high masts from one blast hole to the next was extremely cumbersome and time consuming.

An improvement on these machines were the so-called suspension-type jet piercing machines. On these machines, the jet piercing blowpipes were suspended from a cable so that holes deeper than the blowpipe length could be pierced or chambered. One of the main drawbacks of these type machines was the excessive loss of time and consumables in raising and lowering the blowpipe in the hole. This resulted from the necessity for manual hose handling since it was necessary for loose oxygen, fuel and water hoses to be tensioned and clipped to the suspension cable to prevent their jamming in the hole.

With the above considerations in mind, it is one object of the invention to provide a compact, mobile jet piercing machine.

Another object is to provide a machine which has a relatively short mast compared to the depth of the hole to be pierced or chambered.

Another object is to provide a novel system for suspending and moving the blowpipe along the mast.

Yet another object is to provide a system for handling service hoses to the blowpipe.

Still another object is to provide a unique system for accurately centering the blowpipe over the hole to be pierced or chambered.

Yet another object is to provide a machine having a system for vertically oscillating or "spudding" the blowpipe.

These and other objects will either be pointed out or become apparent from the following detailed description and drawings wherein:

FIGURE 1 is a side elevation view of the machine of the invention;

FIGURE 2 is a partial front elevation of the machine of the invention;

FIGURE 3 is a view taken along the line 3—3 of FIGURE 1;

FIGURE 4 is a side view of the mast and sheave arrangement;

FIGURE 5 is a view of the sheave drive means;

FIGURE 6 is a front view of the anchoring means with the cable arrangement rotated 90 degrees;

FIGURE 7 is a view partially in cross-section showing the hose and blowpipe connection.

Figure 8:
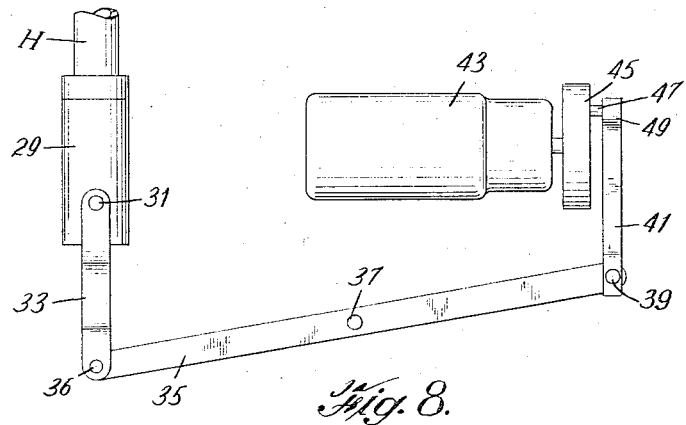
FIGURE 8 is a schematic illustration of the vertical oscillating mechanism.

The above objects are accomplished in a general way by a machine which includes a self-propelled body. On the body is pivotally mounted a mast which has less height when in the vertical position than the depth of the hole to be treated. A sheave is mounted on the mast to be longitudinally movable therealong. A fixed length of hose passes over the sheave. The hose has an inlet end and an outlet end. An anchoring mechanism attaches the inlet end of the hose to but permits limited movability of hose passes over the sheave. The hose has an inlet end fixed inlet end over the sheave and depends therefrom so that as the sheave moves a unit of length along the mast, the hose moves approximately twice that length. A thermal working blowpipe is fixedly attached to the outlet end of the hose depending from the sheave. Service lines including water and fuel lines extend from sources thereof through the hose to the blowpipe. An oxidant, usually air, is supplied from a source thereof to the space in the hose between the service lines and is passed through such hose to the blowpipe. Means are provided extending through the hose and are fixed at the blowpipe and at the body for carrying a major portion of the weight of the blowpipe to reduce the elongation which tends to occur in the hose.

Also provided are means for accurately centering the blowpipe over the hole to be pierced or chambered.

Mechanism is provided for causing a vertical oscillatory motion or "spudding" of the blowpipe.

The machine of the invention has several unique features which have advantages over prior art machines.

One such advantage is the sheave and mast arrangement. As will be described in detail when referring to the drawings, a sheave moves on the mast and a blowpipe is suspended by a flexible hose passing over the sheave. This arrangement permits approximately two units of blowpipe movement for one unit of sheave movement thus permitting a considerable reduction in the height of the mast necessary for piercing and chambering relatively deep holes.

The shorter mast now makes it possible to pivot the mast on the body so that when a hole is completed the mast can be lowered completely or partially onto the body roof and the machine moved at greater speeds to the next hole.

The discovery of a flexible hose arrangement for suspending the blowpipe not only is a great advantage in reducing mast height but also provides a simple convenient way for introducing service hoses and oxidant to the blowpipe without complex hose handling problems.

Having discussed the machine of the invention and its advantages generally, reference should now be made to the drawings to which the following detailed description will make reference.

In FIGURE 1, the machine noted generally at A includes a body section B. The body B rides on crawler tracks C. Each crawler C is individually powered allowing for greater maneuverability. A mast M is pivotally mounted at the front of the machine A. The mast M is pivoted at point 1 on machine A and is raised and lowered by hydraulic means 3. The machine A is provided with two leveling jacks J on either side of the mast M. Similarly, two leveling jacks J' are located at the rear of the machine A. The operator and controls for the machine is housed in a cab F.

A sheave 5 is mounted on a shaft 7 (see FIGURE 3). Shaft 7 has guide means 9 and 9A fixed at its extremities. Guides 9 and 9A ride on tracks 11 which are on each arm 12 of the channel shape mast M. Sheave 5 moves longitudinally along the mast M on tracks 11.

The mechanism for driving sheave 5 along mast M is shown in FIGURES 4 and 5. A variable speed drive motor 13 drives gear 19 through a gear and sprocket chain arrangement 20. A speed reducer 15 is provided between motor 13 and gear 19 so as to provide sheave movement of up to 24 inches/minute. Gear 19 is mounted on a shaft with gear 21. A sprocketed chain 23 driven by gear 21 is fixed to the top and bottom of guide 9 mounted on the shaft 7 of sheave 5 so that movement and direction of movement is controlled by motor 13 through sprocket chain 23.

A clutching mechanism 17 is used to shift from the low speed drive system just described to a high speed drive system. The high speed drive system includes a motor 25 which drives a gear and sprocket chain 28. Chain 28 in turn drives gear 24 (see FIGURE 2) which drives gear 26 and chain 27. Chain 27 is fastened to guide 9A at the top and bottom thereof so as to control the movement of sheave 5. The motor 25 provides for movement of the sheave of from 0–60 ft./min. which is used for high speed feed of the blowpipe.

Motor 13 in this embodiment is a ¼ H.P. variable speed drive with output electrically controlled. Speed reducer 15 has a 60 to 1 ratio. Motor 25 is an air motor capable of delivery 430 ft./lb. @ 60 p.s.i.

A flexible hose H 50 feet in length is attached to the machine A by floating anchoring mechanism G (see FIGURES 2 and 6). Hose H is fitted into and clamped in hollow member 29. The hose H extends up over the sheave 5 and depends from the front side thereof. A blowpipe T is fixed to the hose H.

Extending from either side of the member 29 are pins 31. A yoke 33 attaches the member 29 at pins 31. The yoke 33 is fastened to an arm 35 at 36 (see FIGURE 8). Arm 35 is pivoted at point 37 and has fastened at its other end 39 another arm 41. A drive motor and reducer 43 drives disc 45. Shaft 47 of cam 49 is eccentrically fastened to disc 45. The rotation of disc 45 translates its motion, through the mechanism described, into a 6 to 7 inch, 20 c.p.m. vertical oscillation of the blowpipe T. The vertical oscillation is commonly known as "spudding" of the blowpipe.

The machine being described is ideally suited for a use with a blowpipe wherein air is the combustion supporting gas. Air is supplied from a source thereof into member 29 through inlet 30 into hose H. Service hoses S extend through hose H into the back of blowpipe T. Blowpipe T is fastened to hose H by clamping arrangement K. A cable 51 extends from the blowpipe T to the member 29 and is used to carry a major portion of the blowpipe weight. Cable 51 is fixed at the blowpipe T by a ball detent 53. The cable then extends through hose H and out the bottom of member 29. The cable is anchored by having the end thereof ride over a pulley-like member 55 housed in a bracket 57. The cable 51 is looped over member 59 and fastened by bolts 61. A threaded bifurcated member 63 extends through bracket 65 and is used to take up slack in cable 51 by tightening nuts 67.

Figure 9:
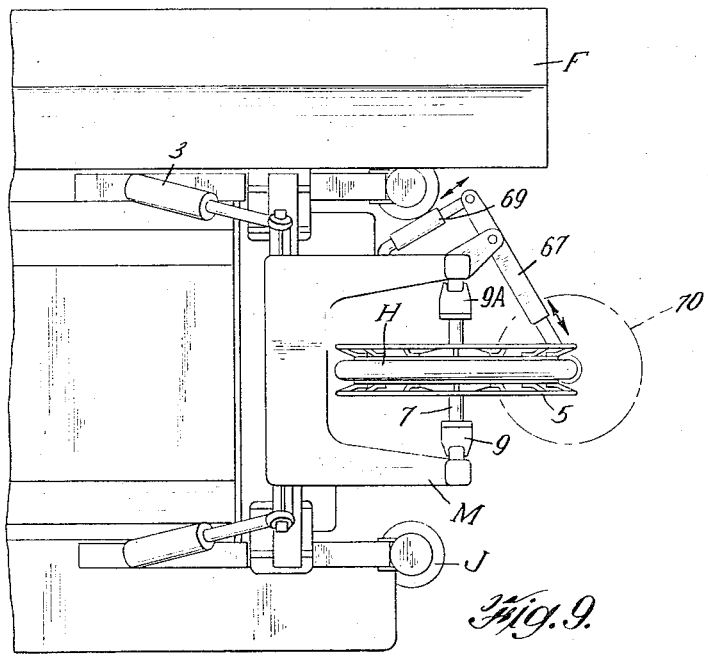
FIGURE 9 is a top view illustrating the mechanism for centering the blowpipe.

In operation, after a piercing or chambering operation is completed and it is desired to move the machine, the blowpipe T is raised into deflector hood D. The mast M is tilted to approximately 15 degrees off the vertical or to the horizontal position shown in phantom in FIGURE 1. The hydraulic jacks are withdrawn. The machine is moved to the next hole location. Rough positioning over the new hole is achieved with crawler track system C. The mast M is raised to the full "up" position. The hydraulic jacks J are extended and the machine leveled. The blowpipe is lowered by lowering of the sheave 5 on the mast M to within three inches of ground level and exact position of the blowpipe T is achieved through a hydraulic swing and extension feature shown in FIGURE 9. Referring to FIGURE 9, exact positioning is achieved by hydraulic members 67 and 69 which coact so as to provide positioning of the blowpipe anywhere within the area defined by circle 70.

Machines of the type just described are especially suited for chambering a predrilled hole. Chambering refers to enlarging an already drilled hole with the jet flame issuing from the blowpipe by making successive passes with the blowpipe down the hole to enlarge it to the desired diameter and shape for subsequent placing of explosives. The machines are also suited for piercing holes.

It will be observed from the foregoing description that we have invented a jet piercing machine which includes a substantially smaller mast while being able to pierce holes of the same depth as previous machines and that our machine is therefore much more mobile. Also, our machine is equipped for easy and quick line-up over a hole thus reducing set up time.

While the invention has been described with respect to a preferred embodiment, it should be understood that modifications can be made to the various parts of the machine or in the arrangement thereof without departing from the spirit and scope of the invention.

What is claimed is:

1. A machine for producing blast holes in minerals and mineral-like bodies comprising in combination a self-propelled body; a mast pivotally mounted on said body and having less height when in the vertical position than the depth of the hole; a sheave longitudinally movable on said mast; a fixed length of hose having an inlet and outlet end; anchoring means fixed to but movable relative to said body for attaching the inlet end of said hose to the body, said fixed length of hose extending from said anchoring means over said movable sheave and depending therefrom to thereby provide approximately 2 units of outlet end of hose movement to 1 unit of sheave movement; a blowpipe for thermally working holes fixedly attached to the outlet end of said hose depending from said sheave; service lines extending from a source thereof through the hose to the blowpipe; means for supplying an oxidant to the space in said hose between said service lines, said hose acting as conduit means for carrying said oxidant from a source thereof to the blowpipe; and means extending through the hose and fixed at the blowpipe and the body for carrying the major portion of the weight of said blowpipe to thereby reduce the elongation which tends to occur in said hose.

2. Machine according to claim 1 wherein the oxidant is air.

3. A machine according to claim 1 and including means mechanically linked to said anchoring means to provide vertical oscillation thereof.

4. A machine according to claim 1 including hydraulic means connected to said blowpipe to provide exact positioning of said blowpipe over a hole to be treated.

5. Apparatus for supplying air and process fluids to a rock-working blowpipe comprising a flexible hose having an inlet and outlet, a blowpipe connected to the outlet end of said hose, a plurality of process fluid hoses extending from said blowpipe through said hose to a source of said process fluids; and a cable fixed to the blowpipe extending through said hose and anchored outside of said hose so that said cable carries the major portion of the blowpipe weight when said blowpipe is suspended from said hose.

References Cited by the Examiner

UNITED STATES PATENTS

| | | | |
|---|---|---|---|
| Re. 24,603 | 2/1959 | Aitchison et al. | 175—14 |
| 2,866,622 | 12/1958 | Murray | 175—15 |

FOREIGN PATENTS

| | | |
|---|---|---|
| 1,330,130 | 5/1963 | France. |
| 2,443 | 1904 | Great Britain. |
| 111,735 | 5/1962 | Pakistan. |

CHARLES E. O'CONNELL, *Primary Examiner.*

D. H. BROWN, *Assistant Examiner.*